United States Patent
Dendauw et al.

(10) Patent No.: US 11,016,019 B2
(45) Date of Patent: May 25, 2021

(54) DEVICE FOR MEASURING ADHESIVE POWER

(71) Applicant: ESTL NV, Deerlijk (BE)

(72) Inventors: Jelle Dendauw, Oostrozebeke (BE); Kristof Baeyens, Belsele (BE); Marc Felix Karel Juwet, Nevele (BE)

(73) Assignee: ESTL NV, Deerlijk (BE)

( * ) Notice: Subject to any disclaimer, the term of this patent is extended or adjusted under 35 U.S.C. 154(b) by 173 days.

(21) Appl. No.: 16/340,406

(22) PCT Filed: Sep. 18, 2017

(86) PCT No.: PCT/BE2017/000041
§ 371 (c)(1),
(2) Date: Apr. 9, 2019

(87) PCT Pub. No.: WO2018/071995
PCT Pub. Date: Apr. 26, 2018

(65) Prior Publication Data
US 2019/0310181 A1 Oct. 10, 2019

(30) Foreign Application Priority Data
Oct. 19, 2016 (BE) .................................. 2016/0158

(51) Int. Cl.
*G01N 19/04* (2006.01)
*G01B 17/00* (2006.01)
(Continued)

(52) U.S. Cl.
CPC ............. *G01N 19/04* (2013.01); *G01B 17/00* (2013.01); *G01L 1/255* (2013.01); *G01N 29/04* (2013.01); *G01N 2291/02827* (2013.01)

(58) Field of Classification Search
CPC ................................ G01L 1/255; G01N 19/04
See application file for complete search history.

(56) References Cited

U.S. PATENT DOCUMENTS 3,631,526 A 12/1971 Brunton
3,693,025 A 9/1972 Brunton
(Continued)

FOREIGN PATENT DOCUMENTS

EP 0866313 A1 9/1998

OTHER PUBLICATIONS

International Search Report and Written Opinion for the International Patent Application No. PCT/BE2017/000041, dated Feb. 13, 2018, 11 pages.

*Primary Examiner* — Paul M. West
*Assistant Examiner* — Mark A Shabman
(74) *Attorney, Agent, or Firm* — Kacvinsky Daisak Bluni pllc

(57) ABSTRACT

A method and device for determining tensile force and adhesive force during the unwinding of a film from a roll without affecting the film, and which are usable at any radius of the spool and at any unwinding speed. The method and the device are based on determining the point where the film releases from the spool, and make use of the reflection of an ultrasonic wave. Emitted and reflected waves are radial at least when the emitted wave is incident upon the film which has not released from the spool. The method and device find applicability where tensile force, caused by the resistance of the roll to rotation, and also by adhesion of the film to the roll, must be determined. The method and device also find applicability where the adhesive force of the film to the roll must be determined.

10 Claims, 1 Drawing Sheet

(51) Int. Cl.
*G01L 1/25* (2006.01)
*G01N 29/04* (2006.01)

(56) References Cited

U.S. PATENT DOCUMENTS

| | | | | |
|---|---|---|---|---|
| 5,248,889 A * | 9/1993 | Blech | ............... | G01L 1/24 |
| | | | | 250/226 |
| 5,651,511 A * | 7/1997 | Crowley | ............... | B65H 16/06 |
| | | | | 242/420.3 |
| 6,089,496 A * | 7/2000 | Dorfel | ............... | B65H 18/00 |
| | | | | 242/413.1 |
| 6,247,664 B1 * | 6/2001 | Petersen | ............... | B65H 63/00 |
| | | | | 242/413.2 |
| 2003/0226928 A1 * | 12/2003 | McNeil | ............... | B65H 23/198 |
| | | | | 242/413.2 |

* cited by examiner

DEVICE FOR MEASURING ADHESIVE POWER

This is a national stage application filed under 35 U.S.C. § 371 of pending international application PCT/BE2017/000041 filed Sep. 18, 2017, which claims priority to Belgian Patent application BE2016/0158 filed Oct. 19, 2016 the entirety of which applications are hereby incorporated by reference herein.

FIELD

The invention lies in the field of mechanical measuring technique and relates to a method and associated device for determining the force necessary to detach from the underlying layer a film wound onto a spool. This detaching force is important for certain (industrial) processes and is therefore often a quality feature of the respective film. The invention will therefore be used in the quality assessment of films by manufacturers, dealers and buyers of film.

BACKGROUND

Film supplied on a spool is used in numerous processes. These can be very diverse types of film such as stretch wrap film for the packaging of goods, cling film, shrink-wrapping, decorative foil as well as labels, self-adhesive paper, . . . . The film adheres here to the underlying layer on the spool and must therefore be detached at the moment the film is unwound.

A first example is stretch wrap film which is used to wrap palletized goods. In many cases a spool of film is placed on a wrapping machine. The film runs over guide rollers and then over two stretch rollers. The second stretch roller has a greater peripheral speed than the first stretch roller, whereby the film is stretched. The stretched film is then wrapped around the palletized goods. The extent to which the film is stretched is very important for the effectiveness of the wrapped film.

Care is taken in practice that the film cannot slip over the stretch rollers, among other ways by providing a large contact are and by covering the stretch rollers with a very high-friction material, optionally by suctioning film onto the rollers.

The total stretch of the film at the moment it is running over the second stretch roller is therefore determined by the difference in peripheral speed between the two stretch rollers and by the stretch occurring during the unwinding of the film. The first-stated factor is precisely known. The second factor depends on the resistance to rotation of the spool and on the force required to detach a film from the underlying layer on the spool. A tensile force FF is present in the film situated between the spool and the next roller. Let r be the actual radius of the spool, M the rotation-resisting torque of the spool, $M/r=FT$ the tangential force and FL the radially oriented detaching force. Then $FF=\sqrt{FL^2+FT^2}$. Another relationship is $FL=FT \cdot tg\gamma$ wherein $\gamma$ is the angle between the plane tangential to the spool on the one hand and the film on the other. The detaching force can therefore be determined by measuring the angle $\gamma$ when the resistance of the spool to unwinding is known. This detaching force can be used on the one hand as a quality feature of the film and can be used on the other to determine the total force FF in the film, and so of the stretch in the film. This invention can therefore be used in devices for determining the quality of the adhesion of the film as well as in packaging machines in which the total stretch of the film is determined.

A second example is the arranging of labels on goods. Labels are supplied on a spool and form one continuous film which is adhered to a carrier which itself also forms a continuous film. The film which consists of the labels is detached from the carrier during production. A determined angle which depends on the adhesive force is inevitably formed between the two films at the point where they release from each other. Knowledge of this mutual angle is already important per se in order to enable optimal setting of the machine which unwinds and arranges the labels on the goods. Knowing the angle also allows the detaching force to be determined, and therefore the quality of the adhesion of the film to the carrier.

A third example is measuring the quality of the adhesion of a film to a product such as a PET bottle. This can be a label made of paper, PE, PP or another material of which the adhesion to the bottle must be assessed. Here too the quality of the adhesion can be assessed by measuring the angle between the film and the plane tangential to the bottle at the point where the label releases from the bottle itself. The method of this example can more generally be applied to containers in general, whether or not they are of round shape. The radius r in the above-stated formulae is then the distance from the point where the film releases from the container to the axis about which the container rotates.

Stated briefly, this means that determining the detaching force FL is an important technical scientific problem with significant industrial applications. This invention allows determination of FL by detection of the point where the film releases from the spool. This method is very generally applicable and the use of the method does not depend on the speed with which the film is unwound from the spool. The method can consequently also be used to determine the influence of the unwinding speed on the detaching force.

DESCRIPTION OF THE INVENTION

It must be understood beforehand that the method and the device of this invention are not limited to the examples and orientations as presented in this text. The method of this invention is likewise not limited to the steps described in the sense that adding and/or inserting additional steps does not detract from the method itself. Dimensions, speeds or other physical quantities as stated below may not be interpreted as limitative unless this is explicitly stated. In this text the term spool must not only be understood as a roll of film but also more generally as a strip of film which wholly or partially envelops a ruled surface. The term wave is used in the singular also if the wave is interrupted in time, has other characteristics in the course of time, is caused by diverse sources.

The method of this invention determines the location of the point L where the film releases from the spool in one or more cross-sections of the spool after which the tensile force in the film after the film has released can be determined. This invention also comprises a device with which this method can be embodied. The method of this invention does not depend on the rotation speed of the spool, on the distance between the outer side of the spool and the axis of the spool, on the material and the colour of the film. This invention also comprises the method for determining the tensile force in the film which has released from the spool and for determining the detaching force. This method has the particular advantage that both forces are determined without damaging the film and that it can be used at any radius of the spool and any unwinding speed. In the case that no detaching force is required (FIG. 1), the film will release from spool (I) in a plane (2) which on the one hand impinges on the spool and on the other impinges on the following roller (3). This plane is called the reference plane. The greater the detaching force required (FIG. 2), the larger the angle β between the film which has been detached (4) and the reference plane (5) will be, and the point where the film releases will be rotated on the spool through an angle α in the direction of rotation of the spool during unwinding. When the point L where the film releases from the spool is known, angles α and β can be calculated. After determining the net torque M which counteracts the rotation of the spool and after determining the radius r of the spool by means of measurement or calculation (FIG. 3), the force FT can be calculated as FT=M/r, the detaching force FL can be calculated as FL=FT·tgγ and the overall film force FF can be calculated as FT/cos γ, wherein γ=α+β. As variant, the determining of M and r can be avoided and the tensile force FF in the film can be determined after measurement and used for the calculation of the force FL, i.e. FL=FF·sin γ. The method of this invention determines the point L where the film releases from the spool with a sensor (6) which transmits a wave (7) radially toward the axis of the spool and which only picks up the reflected wave (7) if it evolves radially away from the spool. The sensor is displaced around spool (8) while the emitted wave remains directed radially toward the axis of the spool. The intersection between on the one hand the enveloping cylinder of the spool and on the other the line of the emitted wave at the moment of the transition between the reflected wave being received and not being received provides the point where the film releases from the spool. After all, when the emitted wave is incident on film which is wound around the spool, the wave is reflected radially. When the emitted wave is incident on film which has released from the spool, the wave will no longer be reflected radially and the reflected wave will no longer be detected by the sensor.

In a preferred embodiment of the device of this invention, use is made of a sensor which emits and receives an ultrasonic sound wave at least when the reflected ultrasonic wave evolves radially in relation to the spool. Transmitter and receiver are mounted on a holder which rotates round the axis of the spool. The plane formed by the axis of the spool and the transmitter thus forms a variable angle δ with the reference plane. In a possible application of this method the movement of the sensor begins at an angle δ of −180° from the reference plane, wherein a positive angle δ corresponds with the positive direction of angle α. During the movement of the sensor wherein δ evolves from −180° to −90°, the signal which corresponds with the reflected wave is averaged. This average value forms a reference value. During the further evolution of angle δ the measured value of the received signal is compared to this reference value and the direction of movement of the sensor is reversed as soon as the measured value is lower than a chosen fraction (k1) of the reference value. The direction of movement is again reversed as soon as δ=−90° or as soon as the measured value is higher than a chosen fraction (k2) of the reference value. This results in a reciprocating movement around the point L wherein the film releases from the spool. In an optional subsequent step of the method of this invention, the position of the point L is unambiguously defined as the point for which the progressive average value of the received signal is lower than a fraction (k3) of the reference signal during a chosen number of reciprocating movements, wherein k1<k3<k2. In a preferred embodiment of the device k1=10%, k2=90%, k3=50%.

In a variant of the device of this invention the radius of the spool is determined. In a first possible embodiment, this takes place by measurement with an individual sensor. In a second possible embodiment this takes place by measurement with the ultrasonic sensor which detects the point L where the film releases from the spool. The radius is measured again each time when the sensor is located with certainty at an angle δ wherein the emitted wave is incident on film which has not released from the spool. In a third possible embodiment the radius is calculated on the basis of an initial value which is corrected with the layer thickness of the layers which have already been unwound. In a fourth possible embodiment two of the previous embodiments are combined.

Figure 4:
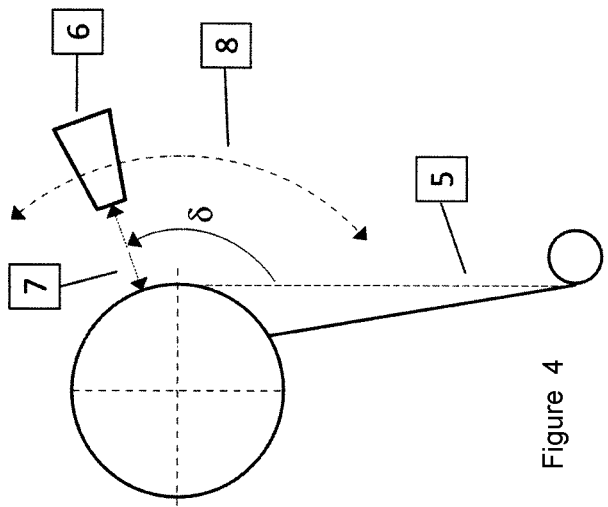
FIG. 4 is a schematic representation of sensor (6), the incident and reflected wave (7) and of the movement of the sensor (8).
Figure 3:
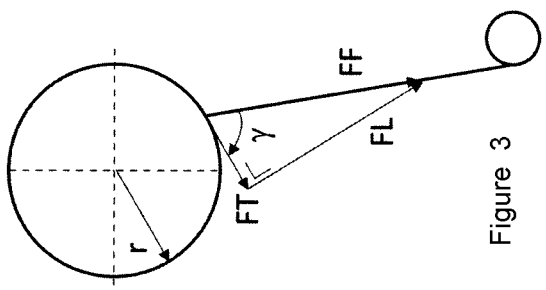
FIG. 3 is a schematic representation of forces FF, FL, FT and angle γ.
Figure 2:
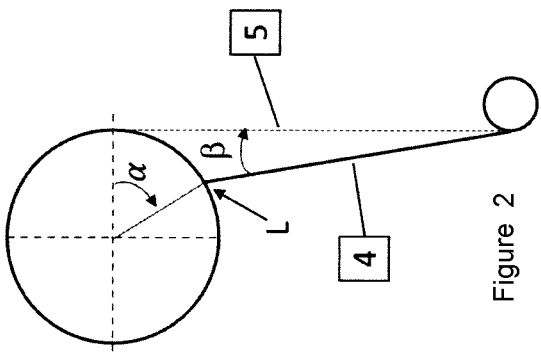
FIG. 2 is a schematic representation of film which has been detached (4), reference plane (5), point L where the film releases and angles α and β with their positive direction.
Figure 1:
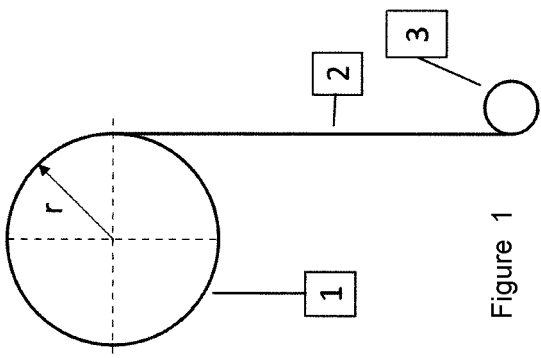
FIG. 1 is a schematic representation of spool (1), reference plane (2), the following roller, be it a guide roller or the first stretch roller (3), in the situation wherein a detaching force FL is not required.

The invention claimed is:

1. A method for determining a point in a random transverse plane of a spool where a film releases from the spool during unwinding of the film from this spool, the method comprising:
   emitting a wave radially toward an axis of the spool;
   wherein the wave is either incident upon the film present on the spool or incident upon the film which has released from the spool,
   wherein at least a fraction of the reflected wave is picked up when, and only when, the reflected wave evolves radially away from the axis of the spool;
   wherein the emitted wave and the reflected wave are ultrasonic waves; and
   wherein the emitted wave is moved from a zone where the emitted wave is radially incident upon the film present on the spool to a zone in which the emitted wave is incident upon the film which has released from the spool, and wherein the point where the film releases from the spool is determined on the basis of the intensity of the picked-up reflected wave.

2. The method as claimed in claim 1, wherein the emitted wave is moved reciprocally from a zone where the emitted wave is radially incident upon the film present on the spool to a zone in which the emitted wave is incident upon the film which has released from the spool and back, wherein the intensity of the picked-up reflected wave is more than halved or more than doubled at the moment the incident wave reaches the point where the film releases from the spool.

3. The method as claimed in claim 1, wherein the intensity of the picked-up reflected wave at a moment when the incident wave is incident upon film present on the spool is used as a measure for a path travelled by the emitted and reflected wave, and wherein this intensity is converted by calibration to a numeric value for the path travelled.

4. The method as claimed in claim 1, wherein the frequency of the emitted wave lies between 100 and 500 kHz.

5. A device for determining a point in a random transverse plane of a spool where the film releases from the spool during unwinding of film from the spool,
   wherein the device comprises a transmitter and a receiver of an ultrasonic wave which are mounted on a movable support,
   wherein the combination of mounting and movement is such that an emitted ultrasonic wave is directed radially toward the spool and that the receiver only receives a wave which evolves radially away from the spool; and
   wherein the transmitter and the receiver of the ultrasonic wave physically form one sensor which is mounted on a support which is movable at a substantially constant distance from an axis of the spool.

6. A device as claimed in claim 5, wherein at least one of the frequency and the intensity of the emitted wave is variable over time.

7. A device as claimed in claim 5, wherein the movement of the support is driven with a stepping motor.

8. A device as claimed in claim 5, wherein the support is movable from a zone in which the emitted ultrasonic wave is incident upon a film present on the spool to a zone in which the emitted ultrasonic wave is incident upon the film which has released from the spool.

9. A device as claimed in claim 5, wherein the support performs a reciprocating movement from a zone in which the emitted ultrasonic wave is incident upon the film present on the spool to a zone in which the emitted ultrasonic wave is incident upon the film which has released from the spool, and back.

10. A device as claimed in claim 5, wherein the one sensor is simultaneously also used to determine the distance between the sensor and the envelope of the spool making use of a principle that the intensity of the picked-up reflected wave correlates with distance as long as the emitted wave is incident upon film which has not released from the spool.

* * * * *